United States Patent [19]

Laws

[11] Patent Number: 5,341,848
[45] Date of Patent: Aug. 30, 1994

[54] FLOW CONDITIONER

[75] Inventor: Elizabeth M. Laws, Salford, England

[73] Assignee: Salford University Business Services Limited, Horwich, United Kingdom

[21] Appl. No.: 809,519

[22] PCT Filed: Jul. 20, 1990

[86] PCT No.: PCT/GB90/01124

§ 371 Date: Mar. 6, 1992

§ 102(e) Date: Mar. 6, 1992

[87] PCT Pub. No.: WO91/01452

PCT Pub. Date: Feb. 7, 1991

[30] Foreign Application Priority Data

Jul. 20, 1989 [GB] United Kingdom ............. 8916629
Nov. 15, 1989 [GB] United Kingdom ............. 8925851

[51] Int. Cl.$^5$ ............................. F15D 01/02
[52] U.S. Cl. ............................. 138/44; 138/40
[58] Field of Search ............... 138/40, 44, 42; 73/861.52; 148/45

[56] References Cited

U.S. PATENT DOCUMENTS

| | | | |
|---|---|---|---|
| 2,600,733 | 6/1952 | Clift | 138/40 |
| 2,825,203 | 3/1958 | Bertin et al. | 138/44 |
| 2,929,248 | 3/1960 | Sprenkle | 73/861.52 |
| 3,105,570 | 10/1963 | Bezemes | 138/44 |
| 3,250,469 | 8/1963 | Colston | 73/861.52 |
| 3,572,391 | 3/1971 | Hirsch | 138/40 |
| 3,645,298 | 2/1972 | Roberts et al. | 138/40 |
| 3,838,598 | 10/1974 | Tompkins | 73/861.52 |
| 4,735,224 | 4/1988 | Pluviose | 138/44 |

FOREIGN PATENT DOCUMENTS

| | | |
|---|---|---|
| 3320753 | 6/1983 | Fed. Rep. of Germany . |
| 2222560 | 3/1974 | France . |
| 272838 | 6/1926 | United Kingdom . |
| 288614 | 4/1928 | United Kingdom . |
| 714805 | 7/1952 | United Kingdom . |
| 1375908 | 3/1972 | United Kingdom . |
| 1389232 | 4/1972 | United Kingdom . |
| 1469648 | 4/1977 | United Kingdom .......... 138/44 |

*Primary Examiner*—James E. Bryant, III
*Attorney, Agent, or Firm*—Rockey, Rikfin and Ryther

[57] ABSTRACT

A flow conditioner comprising an apertured circular plate to be placed in a conduit in an orientation substantially perpendicular to the axis of the conduit. The apertures are circular and are arranged in a plurality of radially spaced circular arrays around a central aperture. The center of the central aperture and the centers of the circular arrays coincide with the center of the circular plate. The apertures in each circular array are equally spaced apart around the center of the plate, and all the apertures in any one circular array are of substantially the same diameter. The size and number of apertures are such that the impedance to flow presented by the plate increases with the radius on which a given array of apertures is arranged.

13 Claims, 2 Drawing Sheets

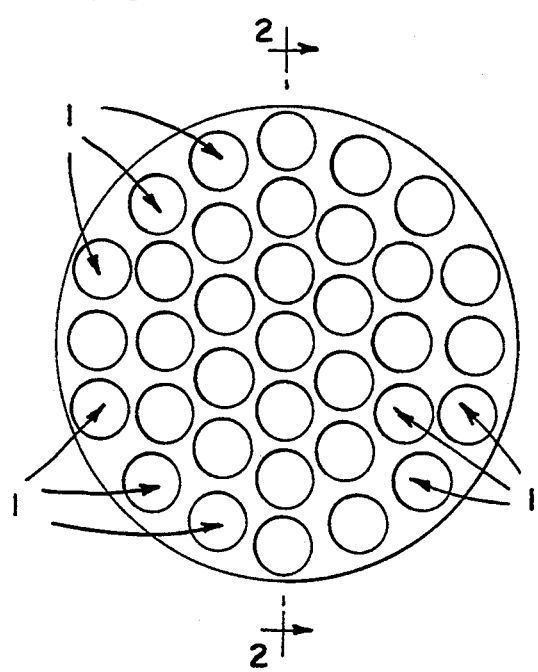
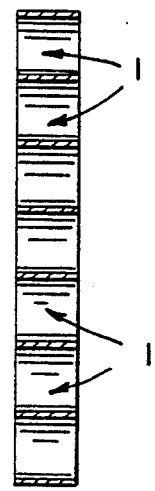
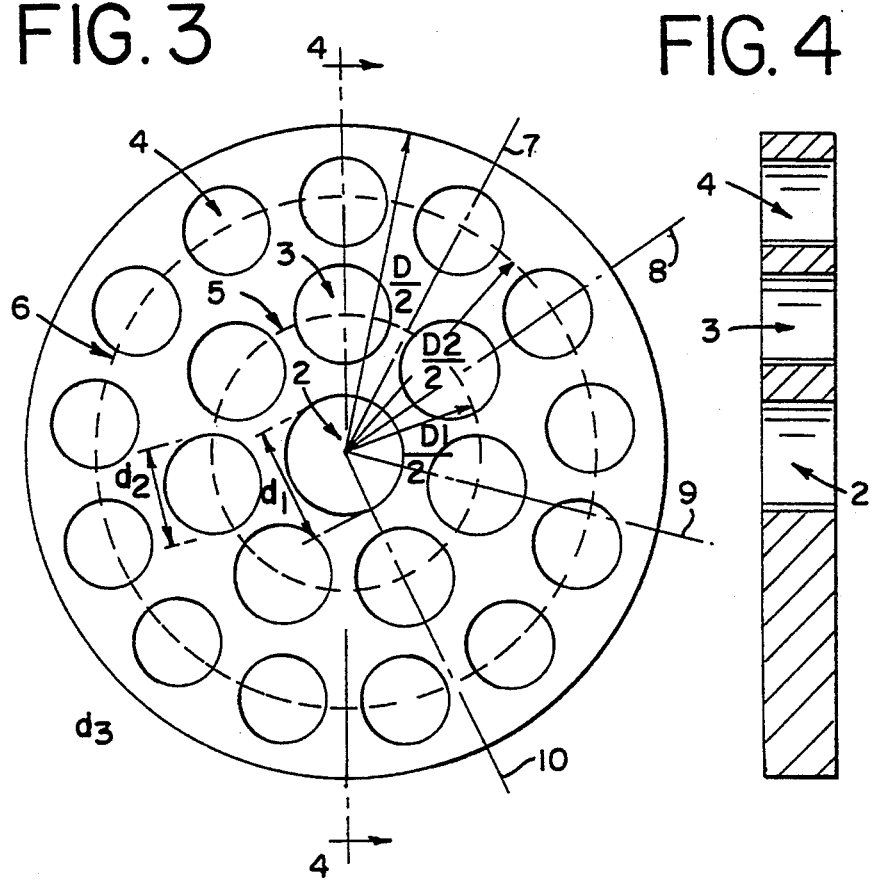
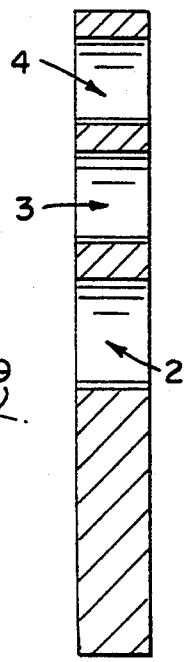
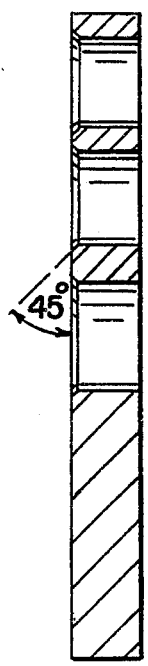

FLOW CONDITIONER

The present invention relates to flow conditioners.

The International Standard on the Measurement of Fluid Flow by Means of Orifice Plates (ISO 5167) states that acceptable flow conditions for metering purposes will be attained when at each point across a pipe cross-section the ratio of local axial velocity to maximum axial velocity at the cross-section agrees to within ±5% with that which would be attained in swirl-free flow at the same radial position at a cross-section located towards the end of a long length of straight pipe, that is a pipe the length of which exceeds 100 pipe diameters. Swirl free conditions are considered to exist when the swirl angle over the pipe cross-section is less than 2°.

Flow non-uniformities, affecting both mean flow, turbulence structure and swirl angle, make it extremely difficult to guarantee this standard of flow quality. Non-uniformities are introduced by bends, valves and other pipe fittings. Straight lengths of pipe of well over 100 pipe diameters in length would be necessary upstream of the metering point to achieve satisfactory swirl values and there is experimental evidence to suggest that even for mean flow levels such a length would not be sufficient.

Clearly to provide such a settling length, even if practical given the constraints of the pipe layout, requires a large capital outlay for pipework. Particularly for large diameter pipes this may outweigh the commercial returns to be gained from the metering project to be undertaken, even possibly making it non-viable. To reduce the settling length necessary to achieve an adequately uniform flow, it is known to introduce a flow conditioning device which is designed to produce the necessary flow conditions within a relatively short length of pipe. Three types of flow conditioner are generally considered, that is a tube bundle flow straightener, a Sprenkle flow straightener, and a Zanker flow straightener. These devices details of which can be obtained from the above-mentioned ISO Standard, partially block the pipe into which they are introduced, resulting in a significant loss in pressure, $\Delta p$, usually represented in terms of a loss coefficient, $K=\Delta p/(\frac{1}{2}\rho u^2)_1$. Typical K values for the three conditioners specified above are 5, 15, and 5, respectively.

Even with the inclusion of such a flow conditioner it is recommended that 22 pipe diameters should be allowed downstream of the conditioner before the meter and that at least 20 straight pipe diameters between the pipe fitting producing the flow non-uniformity and the conditioner should be provided. Thus even with the above conditioning devices at least 42 pipe diameters is needed in the metering length.

A flow conditioner is described in British Patent Specification No. 1375908 which has considerable advantages over the devices previously mentioned. These advantages are:

(i) Simplicity of manufacture. The described device is essentially a perforated plate consisting of 35 holes of the same diameter. Each hole has a diameter equal to 0.13× the pipe diameter.

(ii) Low pressure loss coefficient K of approximately 1.4.

(iii) Relatively short downstream length necessary to produce satisfactory flow conditions.

(iv) Easy to install between pipe flanges as unit depth is 0.13× pipe diameter, (that is the same as the hole size).

(v) Easily adapted to different pipe sizes—unit scales with pipe diameter.

Despite these advantages the device described in British Patent Specification No. 1375908 is not ideal. Specifically the hole distribution is not axi-symmetric and therefore its effect on flow conditions is, at least in the early stages, sensitive to the orientation of the flow conditioner to the flow. Furthermore, although the low pressure loss coefficient is advantageous where pressure losses must be minimized, the attenuation of upstream flow non-uniformities is limited.

It is an object of the present invention to provide an improved flow conditioner.

According to the present invention there is provided a flow conditioner comprising an apertured circular plate intended to be placed in a conduit in an orientation substantially perpendicular to the axis of the conduit, wherein the apertures are circular and are arranged in a plurality of radially spaced circular arrays around a central aperture, the centre of central aperture and the centres of the circular arrays coincide with the centre of the circular plate, the apertures in each circular array are equally spaced apart around the centre of the plate, all the apertures in any one circular array are of substantially the same diameter, and the size and number of apertures in the circular arrays are such that the impedance to flow presented by the plate increases with the radius on which a given array of apertures is arranged.

Preferably, the conditioner comprises an inner array of n apertures adjacent to the central aperture and an outer array of m apertures adjacent to the inner array, the plate having a diameter D, the centres of the apertures of the inner and outer arrays being located on circles of diameter $D_1$ and $D_2$ respectively, the central aperture having a diameter $d_1$, the apertures of the inner and outer arrays having diameters $d_2$ and $d_3$ respectively, and the array radii and aperture diameters being related in accordance with:

$$nd_2D_2 > md_3D_1$$

Such an arrangement ensures that the impedance to flow increases with radius. This simulates normal developed flow conditions in which the velocity in a pipe reduces towards the pipe wall.

Preferably the diameter of the central aperture is greater than the diameter of the apertures in the circular arrays, and for any adjacent pair of circular arrays, the apertures in the radially inner array of the pair are of greater diameter than the apertures in the radially outer array of the pair. The open area of the plate corresponding to the sum of the areas of the apertures is preferably from 50 to 60 percent of the total area of the plate. The pressure loss coefficient may be at least 2.7, and the plate thickness may be at least twelve percent of the plate diameter.

Preferably the upstream edges of each aperture are chamfered.

Various aperture arrangements may be used, e.g. a 1-7-13 arrangement, or a 1-5-12 (See FIG. 9), a 1-7-12 (See FIG. 7), a 1-6-14 (See FIG. 8) or a 1-7-11 (see FIG. 6) arrangement.

The arrangement of apertures in accordance with the invention leads to a plate with a variable resistance coefficient producing a downstream flow which quickly develops to approach fully developed flow conditions.

The advantages of the present invention as compared with the device described in British Patent Specification No. 1375908 are as follows:
(i) A greater degree of axial symmetry in the downstream flow close to the plate, contributing to more rapid flow mixing.
(ii) Superior ability to deal with certain flow distortions.
(iii) Downstream swirl values reduced with greater certainty.
(iv) Easier to manufacture and specify.

Even though the K value is preferably higher than for that described in British Patent Specification No. 1375908 it is relatively low compared to other flow conditioning devices in common usage where K values of 5 to 6 are typical and values of well over 15 are tolerated in some circumstances.

An embodiment of the present invention will now be described, with reference to the accompanying drawings, in which:

FIG. 1 is a front view of a flow conditioning plate of the type described in British Patent Specification No. 1375908;

FIG. 2 is a section on the line II—II of FIG. 1;

FIG. 3 is a front view of a flow conditioning plate in accordance with the present invention;

FIG. 4 is a sectional view on lines IV—IV of FIG. 3, and

FIG. 5 illustrates an alternative configuration in which the upstream edges of the apertures are chamfered

Figure 6:
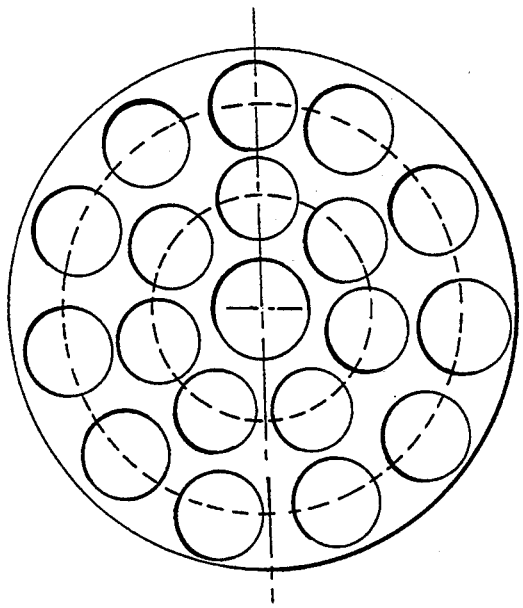
FIG. 6 is an alternate embodiment of the flow conditioning plate of the invention.

Referring to FIGS. 1 and 2, the illustrated flow conditioning plate comprises thirty five apertures 1 each having a diameter equal to 0.13 times the diameter of the plate in which they are formed. The thickness of the plate is also equal to 0.13 times the diameter. Essentially the pattern of apertures is arranged such that for the given aperture diameter the maximum number of apertures is provided. This means that there is a central aperture, a first array of six apertures therearound, a second array of twelve apertures arranged around the outside of the first array, and a further array of sixteen apertures distributed around the periphery of the plate. Such an arrangement provides improved performance compared with traditional flow conditioning devices, for example the bundle flow straightener, the Sprenkle flow straightener and the Zanker flow straightner.

Referring now to FIGS. 3 and 4, the illustrated embodiment of the invention comprises a circular plate in which an axi-symmetrical array of apertures has been formed. The apertures comprise a central aperture 2 of diameter $d_1$, a first intermediate ring of seven apertures 3 of diameter $d_2$, and an outer ring of thirteen apertures 4 of diameter $d_3$. All of the apertures are circular and the centre of each aperture 3 is positioned on an imaginary circle 5 of diameter $D_1$ centered on the centre of plate. The centres of all the apertures 4 are positioned on an imaginary circle 6 of diameter $D_2$ also centered on the centre of the plate.

The diameters of the various apertures may be specified in terms of the plate diameter D as follows:

The central aperture 2 has a diameter of 0.192 D, the intermediate apertures 3 have diameters of 0.1693 D, and the outer apertures 4 have diameters of 0.1462 D. The angular spacing between adjacent apertures 4 corresponds to the angles subtended between lines 7 and 8 and is equal to 27.69 degrees. The angular spacing between the apertures 3 corresponds to the spacing between lines 9 and 10 which subtend an angle of 51.428 degrees. The diameter of the circle 5 is equal to 0.46158 D and the diameter of the circle 6 is equal to 0.8436 D. The thickness of the plate is equal to 0.123 D. The plate diameter D corresponds to the internal diameter of the pipe in which it is positioned. It will be appreciated therefore that the plate will normally incorporate a flange (not shown) to enable it to be fitted in the pipe conveniently.

Thus it can be seen from FIG. 3 and FIG. 4 that the arrangement of apertures is axi-symmetric radially. The radially inner edges of the apertures 4 touch an imaginary circle which is radially outside the radially outer edges of the apertures 3, and the aperture sizes decrease in a radially outward direction. This arrangement makes it possible to adjust the percentage of the pipe surface area which is occupied by apertures to achieve a desired pressure loss coefficient. In the illustrated case the pressure loss coefficient is 2.7.

As illustrated in FIG. 5, the upstream edges of the apertures may be chamfered. In the illustrated case, the chamfered edges subtend an angle of 45° to the plate surface. The depth of the chamfered edges may be equal to D/64.

Figure 7:
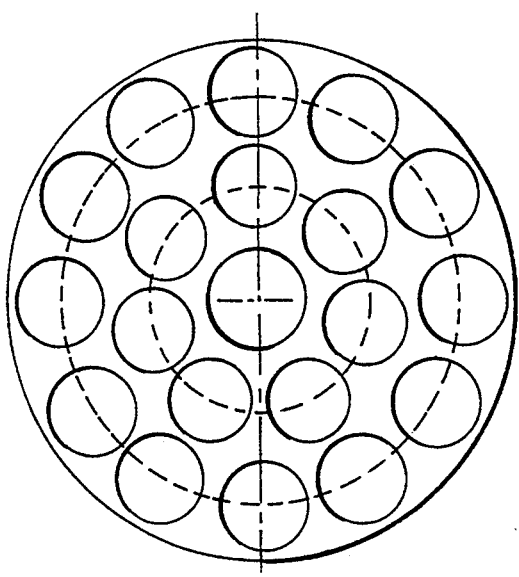
FIG. 7 is another alternate embodiment of the flow conditioning plate of the invention.
Figure 8:
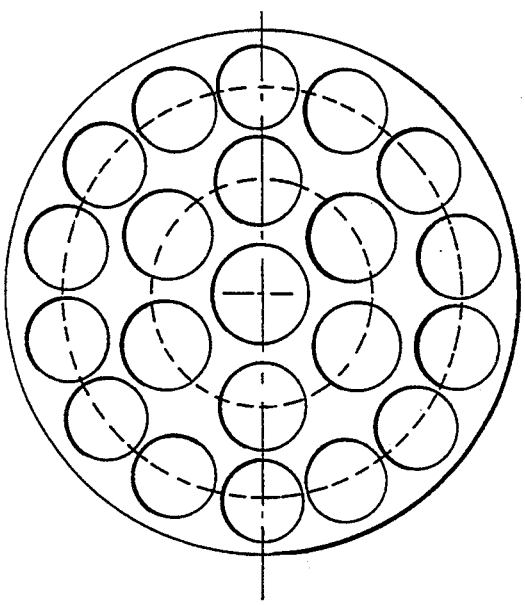
FIG. 8 is still another alternate embodiment of the flow conditioning plate of the invention.

It will be appreciated that embodiments of the present invention can be produced in which the numbers of apertures in the circular arrays of apertures differs from that shown. In the illustrated case the apertures are arranged in a 1-7-13 pattern. Other patterns would be possible however, for example 1-7-12 (See FIG 7), 1-6-14 (See FIG. 8) etc. Thus it is not the number of apertures in each circular array that is of prime importance but rather the general structure of the pattern and the proportion of the plate occupied by the apertures. In the illustrated case, the overall open area or porosity (that is the proportion of the area occupied by apertures) is between 51 and 52%. A preferred range for the overall open area is 50 to 60%.

A series of tests have been conducted to compare the performance of the flow conditioners illustrated in FIGS. 1 and 3. The tests were conducted in pipe rigs of 0.10325 m diameter at a mean velocity of 28 m/s equivalent to a Reynolds number based on mean velocity and pipe diameter of approximately $2 \times 10^5$. Some of the test conditions were produced in a long closed circuit pipe rig where sufficient development length to produce essentially fully developed flow conditions was available. Other tests were carried out in shorter open circuit facilities which allow test layouts to be more easily varied. However irrespective of the test facility used all the measurements were made in similar test sections and with identical instrumentation.

The test conditions which have been simulated upstream of the conditioner include:
Test A: Fully developed flow condition
Test B: Non-uniform flow conditions produced by a partly closed ball valve (i) Setting 1 (approximately ¼ closed)
(ii) Setting 2 (approximately ½ closed)
(iii) Setting 3 (approximately ¾ closed)
Test C: Axi-symmetric flow conditions
(i) Uniform upstream flow.
(ii) Highly peaked upstream flow.
(iii) Wake upstream flow.
Test D: Non-uniform flow condition produced downstream of two 90° bends taking the flow out of the initial approach plane.

Test A—Fully Developed Upstream Flow

Test A was carried out in a long closed circuit test facility in which sufficient length to achieve fully developed conditions was available. A flow conditioner should not disturb an already fully developed flow (or should be able to return the flow to fully developed within the stipulated settling length). Not only should it restore the mean flow profile to its initial state it should also leave the turbulence structure unchanged. There is documentary evidence to suggest that some earlier flow conditioners rather than improve the performance of downstream flow meters can in effect make things worse when the upstream flow is already fully developed because of their inability to cope with fully developed upstream conditions.

The test arrangement was such that the flow conditioner was placed 1.5 D downstream of a traverse plane which was located 102 pipe diameters from the contraction outlet plane of a long straight pipe. Mean flow and axial turbulence intensity readings were made at stations 2.5, 5.5 and 8.5 pipe diameters downstream of the conditioner and compared with the upstream profile measured 1.5 diameters upstream of the conditioner.

In the case of the FIG. 3 unit, the mean flow was close to the upstream flow within a pipe length of 5.5 D. The profile at 8.5 D showed no change from the profile at 5.5 D and was symmetrical about the pipe axis. In the case of the FIG. 1 unit the centre core of the flow was accelerated substantially at 2.5 D. Although at 8.5 D the centre core had decayed to approach the upstream speed level, there was a significant difference between upstream and downstream flows. Furthermore, the turbulence level at the centre of the flow was reduced, and the flow profile was asymmetric. Ideally a conditioner should produce fully developed flow conditions downstream irrespective of the upstream flow quality. The turbulence structure as well as the time mean flow associated with fully developed flow should be reproduced. Thus clearly for test A the FIG. 3 unit performed better than the FIG. 1 unit.

Test B—Upstream Condition Produced by Partially Closed Ball Valve

A series of tests were carried out in a short open circuit test rig in which a ball valve was installed downstream of the tunnel contraction and upstream of the conditioning unit.

The conditioner was placed 3 pipe diameters from the valve outlet plane and measurements were made 1.5 pipe diameter upstream of the conditioner and at stations 1.5, 4.5, 8.5 and 10.5 pipe diameters downstream of the conditioner. Because of the inherent asymmetry in the flow produced by the valve measurements were made in two diametric planes turned through 90° (labelled arbitrarily 0° and 90°) so that the degree of asymmetry in the flow downstream of the conditioning unit could be assessed.

Measurements of mean flow and table of swirl values were obtained for three different cases corresponding to different valve closure settings.

Case B(i) valve approximately ¼ closed

With the unit of FIG. 3, the upstream flow was highly distorted but the downstream flow was within acceptable limit within 4.5 diameters of the conditioner for both the 0° and 90° cases. The maximum swirl angle measured at 4.5 diameters was 1°. With the unit of FIG. 1, the upstream profile distortion was similar to that for the FIG. 3 unit. However the downstream profiles at 0° was just within acceptable limits at 8.5 and 10.5 D but for the 90° case there was a detectable portion of the flow which was outside acceptable limits even at 10.5 D. The maximum swirl angle at 10.5 D was 2°. Thus, the performance of the FIG. 3 unit was clearly superior.

Case B(ii) Valve Approximately ½ close

The upstream flow profiles were much more severely distorted with portions of the flow in which flow separation and reversal has occurred.

In the case of the FIG. 3 unit, for both the 0° and 90° cases the downstream flow was within acceptable limits at 8.5 D and at 8.5 D the maximum swirl angle was 1°. In the case of the FIG. 1, for the 0° set of results the downstream flow was within acceptable limits at 8.5 D whereas at 90° there was a portion of the downstream flow which even at 10.5 D was outside acceptable limits. Swirl valves of 3° at 10.5 D were noted. Thus again the FIG. 3 unit performance was superior to that of the FIG. 1 unit.

Case B(iii) Valve Approximately ¾ closed

The upstream profile was even more distorted with large regions of separation and reversal. In the case of the FIG. 3 unit, for the 0° and 90° cases the downstream profile was within acceptable limits at 10.5 D and the swirl values at that station were 0°. In the case of the FIG. 1 unit, although the profiles for the 0° case were within acceptable limits at 8.5 D they were outside acceptable limits at 90° even at 10.5 D. Maximum swirl values of 2° were noted at 10.5 D. Therefore the FIG. 3 unit again outperformed the FIG. 1 unit.

Test C—Axi-symmetric Test Conditions

These series of tests were again carried out in an open circuit test rig in which different forms of resistance were introduced to produce artificially distorted flow conditions upstream of the conditioner. For case (i) i.e. uniform approach flow the upstream condition was a profile produced close to the tunnel contraction outlet plane where the wall boundary layer was thin. For cases (ii) and (iii) a flow generator was introduced into the flow giving for case (ii) a peaked upstream flow (centre velocity greater than mean velocity) and for case (iii) a wake flow (centre velocity less than mean velocity). Traverses were made at stations 1 diameter upstream of the conditioner and 4.5, and 8.5 and 10.5 diameters downstream of the conditioner.

Case (i) Uniform Approach Flow

In the case of the FIG. 3 unit, the flow was within acceptable limits at 4.5 D. In the case of the FIG. 1 unit, the profiles downstream have maximum velocity levels of about 1.28 times mean velocity which within the test range showed no signs of decaying. Thus even at 10.5 D from the conditioner the profiles were outside acceptable limits.

Case (ii) Peaked Upstream Flow

The generator used to produce a peaked flow condition was an orifice plate with a central hole of diameter D/2. The conditioner was placed 4.5 D from the generator. A highly distorted flow was produced downstream of the orifice plate which in the development length provided decayed to give a peaked flow more typical of a profile found in industrial situations. The resulting upstream flow is peaked with a maximum velocity of about 1.5 times mean velocity. The upstream flow condition was measured 1.5 diameters upstream of the conditioner and the downstream profiles measured at 2.5, 4.5 and 8.5 diameters downstream of the conditioner. For both the FIG. 1 and FIG. 3 units, the downstream flow profiles were within acceptable limits at 4.5 D.

Case (iii) Wake upstream flow

The wake flow was generated by blocking the central portion of the flow with a solid disc supported by thin strips at the periphery of the pipe. The ratio of disc diameter to pipe diameter was 0.5. Again 4.5 pipe diameters of development length was allowed between the generator and the conditioner and the upstream profile was measured 1.5 diameters upstream of the conditioner. The upstream profile produced was highly distorted. In the case of the FIG. 3 unit, the downstream profiles were within acceptable limits as close as 1.5 diameters to the conditioner. In the case of the FIG. 1 unit, the downstream profiles were just outside acceptable limits at 1.5 and 4.5 diameters but inside the limits from 8.5 diameters. Thus for test C for the FIG. 3 unit either exceeded or matched the performance of the FIG. 1 embodiment.

Test D

These tests were carried out in an open circuit test rig connected to two right angled bends taking the flow out of the approach plane. The conditioner was placed 3 diameters from the outlet flange of the second bend and measurements were made 1.5 diameters upstream of the conditioner and 2.5, 5.5 and 8.5 diameters downstream of the conditioner in two orthogonal diametric planes (0° and 90°). Because of the ducting arrangement it was only possible to measure the upstream profile for the 0° setting.

For the FIG. 3 unit, in the 0° case the downstream profiles were within acceptable limits at 5.5 ° D. For the 90° case the profiles were within acceptable limits at 8.5 D. The maximum swirl angle at 8.5 D was 1°. For the FIG. 1 unit, the downstream profiles for both the 0° and 90° cases were within acceptable limits at 4.5 D but the swirl angles although not exceeding a maximum magnitude of 2° varied between −2° and +2° at 8.5 D. Thus even in this test the FIG. 3 unit gave better results because of the significantly lower downstream swirl variation produced.

To summarize the test results, for most of the upstream test cases the FIG. 3 unit performed better than the FIG. 1 unit. For all the test cases apart from case B(iii), which represented the most severe upstream distortion setting the FIG. 3 unit produced a downstream flow which was within acceptable limits within 8.5 diameters of the conditioner with corresponding swirl angles with a maximum value of 1°. The conditioner was placed 3 pipe diameters downstream of the source of disturbance (e.g. three diameters from the outlet plane of a bend or partially closed valve). Thus the FIG. 3 unit would require a maximum settling length of 12 pipe diameters between source of disturbance and flow meter with 3 diameters between source and conditioner and a 9 diameter settling length downstream. For many test conditions an even shorter downstream length would be acceptable. This compares with a claimed length of eleven diameters for the FIG. 1 unit, but as is clear from the above there is evidence to show that in many instances this unit does not give an acceptable flow quality given the specified downstream settling length.

Versions of the FIG. 3 unit have been tested in pipes of 140 mm and 312 mm diameter where the conditioning unit has been scaled with the pipe size. These results confirmed the acceptable flow quality produced by the FIG. 3 unit.

Mention is made above of the fact that hole arrangements other than the 1-7-13 arrangement of FIG. 3 are possible. Various alternative hole arrangements are discussed below.

A perforated plate could be produced with a central hole, n holes on a p.c.d (pitch circle diameter) of 0.4616 D, where D is the plate diameter, and an outer ring of m holes on a p.c.d of 0.8436 D, If all the holes were of the same size, diameter d, then in order to make the total open area the same as the 1-7-13 plate:

$$(d/D)^2 + n(d/D)^2 + m(d/D)^2 = 0.5156$$

i.e. if $N = n + m + 1$ is the total number of holes $$d/D = 0.718/\sqrt{N}$$

To maintain the same open area in each of the two outer rings i.e. the same porosity grading, it is necessary that:

$$n(d/D)^2 = 0.2006$$

and $$m(d/D)^2 = 0.27786$$

i.e. $n/m = 0.722$

The hole diameter must be such that the inner and outer rings of holes do not overlap and that the outer ring of holes lie within the pipe diameter D. This means that $d/D < 0.1564$. i.e. $d/D = 0.718/\sqrt{N} < 0.1564$ i.e. $N > 22$ Also to ensure that the two arrays of holes can be accommodated within the two selected pitch circles it is necessary that $nd < 1.45$ D and $md < 2.65$ D.

Looking at what this now implies for a particular plate the following table applies:

| N  | d/D     | n          | m           | n/m   | nd/1.45D | md/2.65D |
|----|---------|------------|-------------|-------|----------|----------|
| 22 | 0.15308 | 8.56 = 9   | 11.85 = 12  | 0.75  | 0.9502   | 0.693    |
| 23 | 0.1497  | 8.49 = 9   | 12.39 = 13  | 0.692 | 0.929    | 0.734    |
| 24 | 0.14656 | 9.338 = 10 | 12.936 = 13 | 0.769 | 1.01     | 0.718    |
| 25 | 0.1436  | 9.728 = 10 | 13.475 = 14 | 0.714 | 0.99     | 0.7586   |
| 26 | 0.1408  | 10.12 = 11 | 14.014 = 14 | 0.7857| 1.068    | 0.7438   | i.e. only for N=22,23 and 25 can the middle array be accommodated and even for these values of N the holes would have practically run into each other.

Even for these values of N it is doubtful whether the plate could perform as well as the original 1-7-13 plate since the open area of the central hole would be considerably reduced. It is unlikely therefore that a plate of uniform aperture size could be preferable to the unit shown in FIG. 3. Nevertheless useful results could be obtained with a uniform aperture size.

Having discussed possible plate configurations in which the holes are all of the same size, arrangements with varying hole sizes are discussed below.

Assuming a perforated plate with a central hole of diameter d1, n holes of diameter d2 on a p.c.d. of 0.46158 D and an outer ring of m holes of diameter d3 on a p.c.d. of 0.8436 D, then in order to make the total open area the same as the original 1-7-13 plate it is necessary for:

$$(d1/D)^2 + n(d2/D)^2 + m(d3/D)^2 = 0.5156$$

To maintain the same open area in each of the two outer rings i.e. the same porosity grading, it is necessary that:

$$n(d2/D)^2 = 0.2006$$

and $$m(d3/D)^2 = 0.27786$$

assuming d1=0.1924 D as in the original 1-7-13 plate.

Again it is necessary to ensure that the hole diameter is such that the inner and outer rings of holes do not overlap and that the outer ring of holes lie within the pipe diameter D. This means that the following conditions must apply:

$$d2 < 0.26918\ D\quad d2+d3 < 0.382\ D\quad \text{and}\ d3 < 0.1564\ D$$

As the two arrays of holes must be accommodated within the two selected pitch circles we must have nd2/D<1.45 and md3/D<2.65.

For such a plate the following table applies:

| OUTER RING OF HOLES | | | | INNER RING OF HOLES | | | |
|---|---|---|---|---|---|---|---|
| m | d3/D | md3/ D/2.65 | gap between holes/D | n | d2/D | nd2/ D/1.45 | gap between holes/D |
| 3 | 0.3043 | d3 > .1564 | | 3 | 0.25858 | | |
| 4 | 0.2636 | d3 > .1564 | | 4 | 0.22394 | | |
| 5 | 0.2357 | d3 > .1564 | | 5 | 0.200299 | 0.6907 | 0.09 |
| 6 | 0.2152 | d3 > .1564 | | 6 | 0.1828 | 0.7564 | 0.06 |
| 7 | 0.1993 | d3 > .1564 | | 7 | 0.16923 | 0.817 | 0.04 |
| 8 | 0.1864 | d3 > .1564 | | 8 | 0.1583 | 0.8733 | 0.02 |
| 9 | 0.1757 | d3 > .1564 | | 9 | 0.1493 | 0.9267 | 0.01 |
| 10 | 0.1667 | d3 > .1564 | | 10 | 0.1416 | 0.97655 | 0.003 |
| 11 | 0.1589 | d3 > .1564 | | | | | |
| 12 | 0.1522 | 0.687 | 0.069 | | | | |
| 13 | 0.1462 | 0.717 | 0.057 | 11 | 0.13504 | >1 | |
| 14 | 0.1409 | 0.744 | 0.048 | 12 | 0.1293 | >1 | |
| 15 | 0.13601 | 0.77 | 0.041 | 13 | 0.1242 | >1 | |
| 16 | 0.1318 | 0.796 | 0.033 | 14 | 0.1197 | >1 | |
| 17 | 0.12786 | 0.82 | 0.028 | 15 | 0.1156 | >1 | |
| 18 | 0.12426 | 0.84 | 0.023 | 16 | 0.11197 | >1 | |
| 19 | 0.12093 | 0.8675 | 0.018 | 17 | 0.10868 | >1 | |
| 20 | 0.1179 | 0.889 | 0.015 | 18 | 0.10556 | >1 | |
| 21 | 0.11503 | 0.91 | 0.011 | | | | |
| 22 | 0.11238 | 0.933 | 0.008 | | | | |
| 23 | 0.1099 | 0.954 | 0.005 | | | | |
| 24 | 0.10759 | 0.97 | 0.0028 | | | | |
| 25 | 0.1054 | 0.994 | 0.0006 | | | | |
| 26 | 0.10338 | >1 | | | | | |

Thus taking into account the constraints on d2 and d3 then 3<n<10 and 12<m<25. For n=3,m must be >19 or d2+d3 >0.382 D. Also it is worth noting that from a structural point of view the higher values of m and n will leave the plate fairly weak and difficult to manufacture.

The last column in the table indicates that for m>19 less than 0.002 D of material is left between adjacent holes, which for D<100 mm implies less than 2 mm of material. Also for n=3 very little material would be left between the two rings of holes since d2+d3 will be >0.382 when m<19 or close to 0.382 for m>19.

Figure 9:
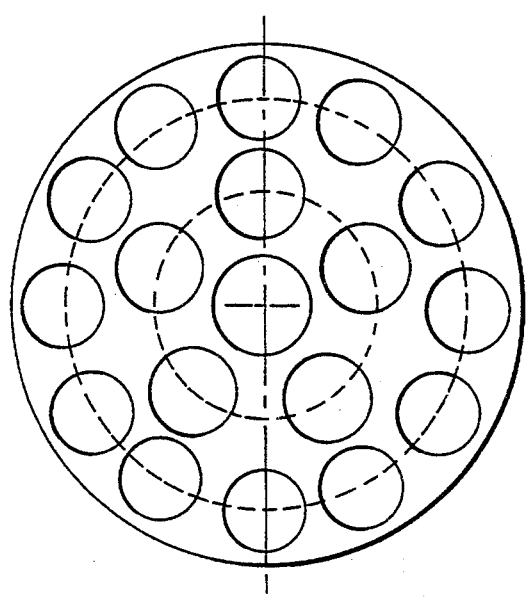
FIG. 9 is yet another alternate embodiment of the flow conditioning plate of the invention.

It would appear that the plate with the minimum number of holes is 1:5:12 (See FIG. 9) although with this arrangement there may be little material left at some points between the two rings of holes.

A safer combination could be to go to the next arrangement i.e. 1:6:12 in which it would be possible to achieve almost complete axial symmetry in the hole arrangement.

It is possible to specify the arrangement of apertures by reference to the porosity P, where P is the ratio of the open area of the plate to the total plate area. In the embodiment described with reference to FIG. 3, P=0.5155. For a plate defined as above with a central aperture of diameter $d_1$, an inner ring of apertures of diameter $d_2$, and an outer ring of apertures of diameter $d_3$, the inner ring having a pitch circle diameter of 0.4616 D, and the other ring having a pitch diameter of 0.8436 D, then:

$$d_1 = 0.2679D\ \sqrt{P}$$

$$d_2 = 0.6238D\ \sqrt{p/n}$$

$$d_3 = 0.7341D\ \sqrt{p/m}$$

In order to accommodate the rings of apertures on the specified pitch circles (different pitch circle diameter could of course be specified), and to ensure that the apertures do not overlap, the following constraints apply:

| |
|---|
| $nd_2 < \pi \times 0.4616D$, i.e. $nd_2 < 1.45D$ |
| $md_3 < \pi \times 0.8436D$, i.e. $md_3 < 2.65D$ |
| $d_1 + d_2 < 0.4616D$ |
| $d_2 + d_3 < 0.382D$ |

$d_3$ must be less than 0.1564D to ensure that the outer ring of apertures is wholly contained within the pipe diameter D.

Thus: $0.7341D\ \sqrt{p/m} \leq 0.1564D$ $\therefore m \geq 22.031\ P$

The following limits on m thus apply as P is varied:

| P | Minimum m | d3/D maximum |
|---|---|---|
| 0.1 | 3 | 0.134 |
| 0.2 | 5 | 0.147 |
| 0.3 | 7 | 0.152 |
| 0.4 | 9 | 0.155 |
| 0.5 | 12 | 0.150 |
| 0.6 | 14 | 0.152 |
| 0.7 | 16 | 0.154 |

| P | Minimum m | $d_3/D$ maximum |
|---|---|---|
| 0.8 | 18 | 0.155 |
| 0.9 | 20 | 0.155 | note that for P>0.7, $md_3$>2.65D.

Optimum performance is likely with a plate porosity in the range 0.5 to 0.6.

The limits on m and n for the range of porosity are:

| P | m minimum | n minimum (if $d_1 + d_2 < 0.4616D$) | n minimum (if $d_2 + d_3 < 0.382D$) |
|---|---|---|---|
| 0.50 | 12 | 3 | 6 |
| 0.51 | 12 | 3 | 6 |
| 0.52 | 12 | 3 | 6 |
| 0.53 | 12 | 3 | 6 |
| 0.54 | 12 | 3 | 6 |
| 0.55 | 13 | 4 | 6 |
| 0.56 | 13 | 4 | 6 |
| 0.57 | 13 | 4 | 6 |
| 0.58 | 13 | 4 | 6 |
| 0.59 | 13 | 4 | 6 |
| 0.60 | 14 | 5 | 6 |

Thus the described 1-7-13 plate is just one of a number of plates which should give similar downstream flow properties.

Which hole distribution would be most appropriate for a particular installation would be a matter of further consideration though there would seem to be considerable merit in achieving the required downstream conditions with a plate with a minimum number of holes as this will give a reasonable amount of solid material between adjacent holes in each ring.

I claim:

1. A flow conditioner comprising an apertured circular plate intended to be placed in a conduit in an orientation substantially perpendicular to the axis of the conduit, wherein the apertures are circular and are arranged in an inner array of apertures adjacent a central aperture and an outer array of apertures adjacent the inner array said inner array including n apertures said outer array including m apertures, the plate having a diameter D, the centers of the apertures of the inner and outer arrays being located on circles of diameter $D_1$ and $D_2$ respectively, the central aperture having a diameter $d_1$, the apertures of the inner and outer arrays having diameters $d_2$ and $d_3$ respectively, and the array radii and aperture diameters being related in accordance with:

$nd_2 D_2 > md_3 D_1$, the center of the central aperture and the centers of the circular arrays coincide with the center of the circular plate, the apertures in each circular array are equally spaced apart around the center of the plate, all the apertures in any one circular array are of substantially the same diameter, and the size and number of apertures in the circular arrays are such that the impedance to flow presented by the plate increases with the radius on which a given array of apertures is arranged.

2. A flow conditioner according to claim 1, herein n is equal to seven and m is equal to thirteen.

3. A flow conditioner according to claim 2, wherein the inner array has apertures of diameter $d_2$ equal 0.1693 D and a diameter $D_1$ equal to 0.4616 D, the outer array has apertures of diameter $d_3$ equal to 0.1462 D and a diameter $D_2$ equal to 0.8436 D, and the central aperture has a diameter equal to 0.1920 D.

4. A flow conditioner according to claim 1, wherein n is equal to seven and m is equal to eleven or twelve.

5. A flow conditioner according to claim 1, wherein n is equal to six and m is equal to fourteen.

6. A flow conditioner according to claim 1, wherein n is equal to five and m is equal to twelve.

7. A flow conditioner according claim 1, wherein the diameter of the central aperture is greater than the diameter of the apertures in the circular arrays, and for any adjacent pair of circular arrays, the apertures in the radially inner array of the pair are greater diameter than the apertures in the radially outer array of the pair.

8. A flow conditioner according to claim 1, wherein the open area of the plate corresponding to the sum of the areas of the apertures is from 50 to 60 percent of the total area of the plate.

9. A flow conditioner according to claim 1, wherein the pressure loss coefficient is at least 2.7.

10. A flow conditioner according to claim 1, wherein the plate thickness is at least twelve percent of the plate diameter.

11. A flow conditioner according to claim 1, wherein the upstream edges of each aperture are chamfered.

12. A flow conditioner according to claim 11, wherein the chamfered edges subtend an angle of 45° to the plate surface.

13. A flow conditioner according to claim 11 or 12, wherein the chamfered edges extend to a depth of one sixty fourth of the plate diameter.

* * * * *